United States Patent
Peyron et al.

(10) Patent No.: US 9,617,955 B2
(45) Date of Patent: Apr. 11, 2017

(54) CASCADE THRUST REVERSER FOR AN AIRCRAFT TURBOJET ENGINE

(71) Applicant: AIRCELLE, Gonfreville l'Orcher (FR)

(72) Inventors: Vincent Peyron, Le Havre (FR); Laurent Georges Valleroy, Le Havre (FR); Franck Depoortere, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 94 days.

(21) Appl. No.: 14/620,543

(22) Filed: Feb. 12, 2015

(65) Prior Publication Data

US 2016/0245229 A1    Aug. 25, 2016

Related U.S. Application Data

(63) Continuation of application No. PCT/FR2013/051815, filed on Jul. 26, 2013.

(30) Foreign Application Priority Data

Aug. 20, 2012    (FR) ...................................... 12 57867

(51) Int. Cl.
   *F02K 1/62*    (2006.01)
   *F02K 1/72*    (2006.01)
   *F02K 1/76*    (2006.01)

(52) U.S. Cl.
   CPC ................ *F02K 1/625* (2013.01); *F02K 1/72* (2013.01); *F02K 1/763* (2013.01); *F02K 1/766* (2013.01)

(58) Field of Classification Search
   CPC ... F02K 1/72; F02K 1/763; F02K 1/70; F02K 1/766; F02K 1/372; F02K 1/54; F02K 1/56; F02K 1/64; F02K 1/92; F02K 1/06; F02K 1/383
   See application file for complete search history.

(56) References Cited

U.S. PATENT DOCUMENTS

| | | | | |
|---|---|---|---|---|
| 3,500,645 A | * | 3/1970 | Hom Felix | ............... F02K 1/72 239/265.29 |
| 3,511,055 A | | 5/1970 | Timms | |
| 4,145,877 A | * | 3/1979 | Montgomery | ............ F02K 1/72 60/226.2 |

FOREIGN PATENT DOCUMENTS

| | | |
|---|---|---|
| FR | 2 960 600 A1 | 12/2011 |
| WO | 2010/142881 A1 | 12/2010 |

OTHER PUBLICATIONS

International Search Report issued Sep. 27, 2013 in International Application No. PCT/FR2013/051815.

* cited by examiner

*Primary Examiner* — Phutthiwat Wongwian
*Assistant Examiner* — Marcos O Diaz
(74) *Attorney, Agent, or Firm* — Burris Law, PLLC

(57) ABSTRACT

The present disclosure relates to a cascade thrust reverser providing that when a sliding cowl and a flap are in a direct jet position, a hook is held in engagement with another hook and the flap is immobilized inside of a housing of the sliding cowl by a stem of a telescopic connecting rod subjected to pre-stress generated by a compressed spring located in the body of the connecting rod. When the sliding cowl starts to slide from the direct jet position toward the reverse jet position, the hooks disengage each other and the stem engages with an extension in the body of the connecting rod, so that the flap is rotated from the direct jet position toward the reverse jet position due to the tensile force exerted by the stem.

3 Claims, 3 Drawing Sheets

CASCADE THRUST REVERSER FOR AN AIRCRAFT TURBOJET ENGINE

CROSS-REFERENCE TO RELATED APPLICATIONS

This application is a continuation of International Application No. PCT/FR2013/051815, filed on Jul. 26, 2013, which claims the benefit of FR 12/57867, filed on Aug. 20, 2012. The disclosures of the above applications are incorporated herein by reference.

FIELD

The present disclosure relates to a cascade thrust reverser for aircraft turbojet engine.

BACKGROUND

The statements in this section merely provide background information related to the present disclosure and may not constitute prior art.

A cascade thrust reverser typically comprises a plurality of deviation cascades fixed downstream of the turbojet engine fan, and a cowl defining the stream of cold air of the turbojet engine, slidably mounted between a position called "direct jet" in which it covers the deviation cascades, and a position called "reverse jet", in which it uncovers these cascades.

The direct jet position corresponds to the operating mode of the turbojet engine and to the nacelle thereof associated in cruise situation.

The operating mode in reverse jet corresponds to landing situations, in which part of the cold air flow generated by the fan is redirected towards the front of the nacelle, in such a manner as to contribute to the braking of the airplane.

More particularly, in direct jet situation, thrust reversal flaps mounted pivotally inside the upstream part of the sliding cowl, hinder the cold air flow generated by the fan of the turbojet engine, and direct it partially through the deviation cascades, towards the upstream of the nacelle, thus allowing to achieve the required braking operations.

In direct jet situation, these thrust reversal flaps are arranged in housings formed in the upstream part of the sliding cowl, thus defining with the intrados of this cowl an aerodynamic continuity allowing the circulation of the cold air flow from the fan towards the downstream of the nacelle, in order to provide the thrust force required for the propulsion of the airplane.

A noted recurrent issue is the vibration of the thrust reversal flaps in direct jet situation, disrupting the quality of the aerodynamic flowing of the cold flow and causing premature wear of the different hinges involved in the putting into movement of these thrust reversal flaps.

SUMMARY

The present disclosure provides a cascade thrust reverser, comprising:
a stationary front frame,
a plurality of deviation cascades integral with this front frame,
a sliding cowl mounted between a direct jet position where it covers these cascades, and a reverse jet position in which it uncovers these cascades,
at least one housing for receiving a thrust reversal flap formed in the upstream part of the sliding cowl,
at least one thrust reversal flap pivotally mounted in this housing, between a direct jet position where it is arranged in this housing, and a reverse jet position in which it exits this housing, and
a connecting rod mechanism connecting said front frame to said flap, suitable for making said thrust reversal flap swivel from its direct jet position to its reverse jet position as a result of the sliding of said cowl from its direct jet position to its reverse jet position,
this thrust reverser being characterized in that it comprises a first hook mounted stationary on the inside of said housing, and in that said connecting rod mechanism comprises a telescopic connecting rod comprising:
a body provided with a second hook,
a stem slidably mounted inside this body,
a spring returning this stem in extension position with respect to the body, and
a stop preventing the stem from exiting the body,
the set of these members being arranged in such a manner that:
when said sliding cowl and said flap are in direct jet position, said second hook is maintained engaged with said first hook and said flap is immobilized at the bottom of said housing by said stem subjected to pre-stress caused by said compressed spring, and
when said sliding cowl has first started sliding from its direct jet position towards its reverse jet position, said second hook becomes disengaged from said first hook and said stem engages with an extension in said body, allowing the rotation of said flap from its direct jet position towards its reverse jet position under the tensile force exerted by said stem.

Thanks to the combined presence of this telescopic connecting rod with actuating spring of the thrust reversal flap, and the hooks mounted on the one hand in the housing of the flap and on the other hand on the body of the telescopic connecting rod, it is obtained a pre-stressed locking of the thrust reversal flap in direct jet position, thus allowing to cancel all unwanted vibration phenomena noted in the prior art.

According to other features of the present disclosure:
said connecting rod mechanism further comprises a triangle of hinged connecting rods, interposed between said telescopic connecting rod, said housing and said thrust reversal flap: such a hinged triangle allows in particular to create the lever arm necessary for the tensile forces imprinted by the telescopic connecting rod during the passage of the sliding cowl from its direct jet position to its reverse jet position to be sufficient for countering the forces exerted on the flap by the dynamic pressure of the air diverted from the cold flow of the turbojet engine.

The present disclosure also relates to a nacelle for airplane engine equipped with a thrust reverser in accordance which the preceding.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
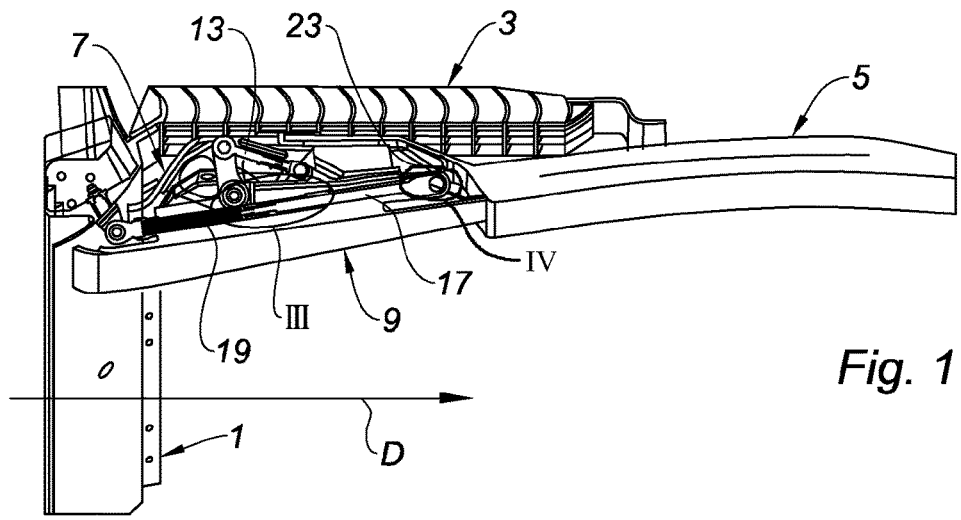
FIG. 1 represents in perspective the area where there is a thrust reversal flap of a thrust reverser according to the present disclosure, when this reverser is in direct jet position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Now it is referred to FIG. 1, on which it can be seen that the thrust reverser according to the present disclosure comprises a stationary front frame 1, integral with a turbojet engine fan casing (not represented).

The stationary front frame 1, defining a substantially annular shape, supports a plurality of deviation cascades 3 disposed side by side at the periphery of this front frame.

Figure 9:
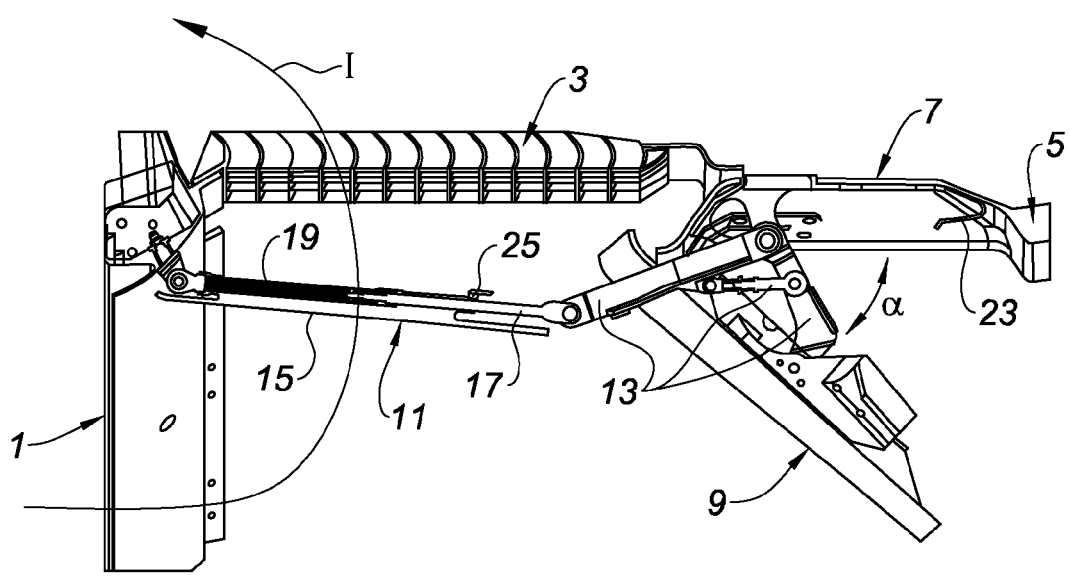
FIG. 9 is a view similar to that of FIGS. 1 and 5, when the thrust reverser is in indirect jet position.

A sliding cowl 5, comprising in its upstream part a housing 7, is moveable between a direct jet position represented on FIG. 1, in which its covers the deviation cascades 3, and an indirect jet position visible on FIG. 9, in which it uncovers these cascades 3.

Inside the housing 7 of the sliding cowl 5 are mounted side by side a plurality of thrust reversal flaps 9, mounted pivotally between a direct jet position represented on FIG. 1, in which they are in the aerodynamic extension of the sliding cowl 5, and a reverse jet position represented on FIG. 9, in which they define a marked angle a with respect to this sliding cowl.

It will now be focused on the mechanisms for actuating the thrust reversal flaps 9 between their positions represented on FIGS. 1 and 9.

Figure 5:
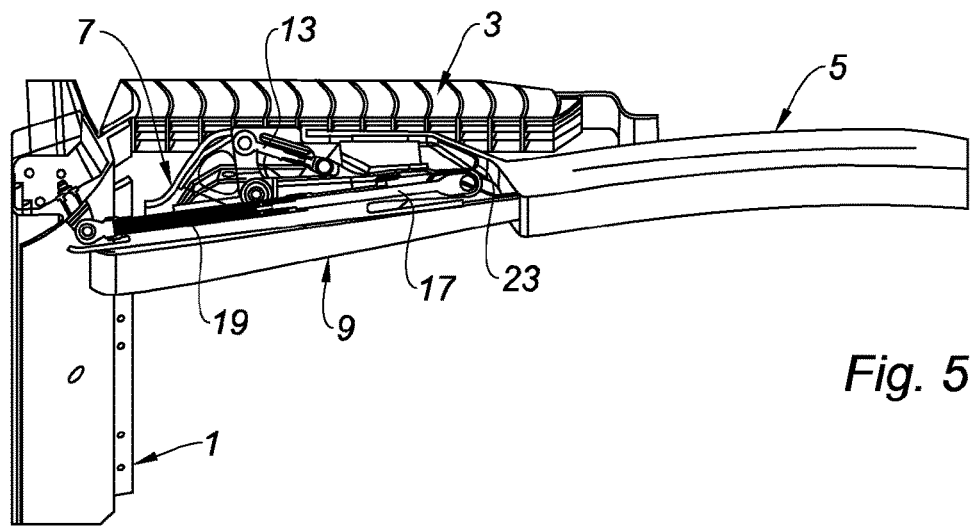
FIGS. 5 to 8 are similar views respectively to those of FIGS. 1 to 4, when the thrust reverser is switching from its direct jet position to its reverse jet position.

As is visible on FIGS. 1, 5 and 9, these mechanisms each comprise on the one hand a telescopic connecting rod 11, and on the other hand a triangle hinged with connecting rods 13.

The hinged triangle 13 is known per se, and the originality of the present disclosure is substantially based on the telescopic connecting rod 11.

As is visible in particular on FIGS. 1, 2, 5, 6 and 9, this telescopic connecting rod 11 comprises on the one hand a body 15 mounted swiveling on the front frame 1, and on the other hand a stem 17 slidably mounted inside this body 15, a spring 19 returning the stem 17 towards its extension position visible on FIG. 9, and a stop 21 preventing the stem 17 from exiting the body 19.

A first hook 23, visible on FIGS. 1, 2, 4, 5, 6, 8 and 9 is mounted inside the housing 7.

Figure 2:
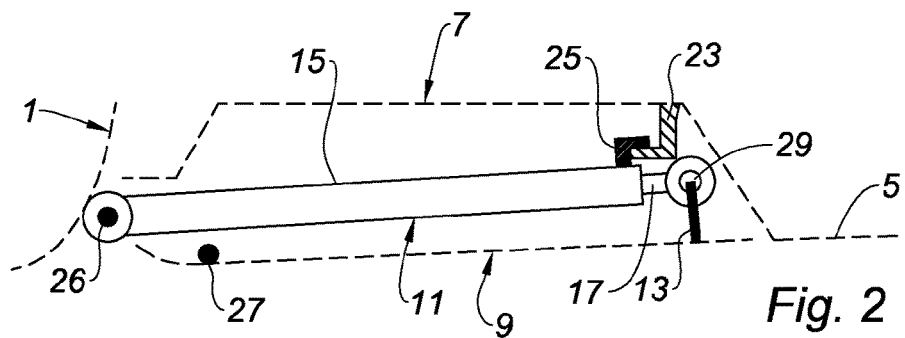
FIG. 2 is a schematic representation of the main members of FIG. 1.
Figure 3:
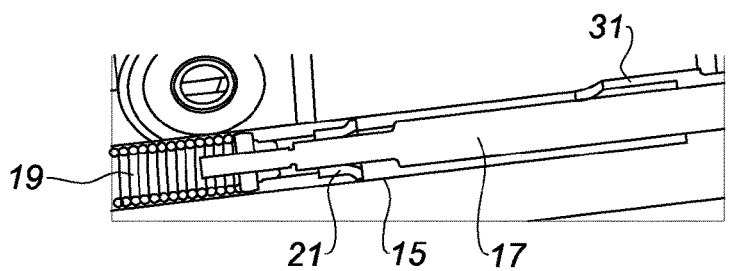
FIG. 3 is a detailed view of the area III of FIG. 1.

A second hook 25, integral with the body 15, is able to cooperate with the first hook 23 when the thrust reversal flap is in the direct jet configuration represented on FIGS. 1 and 2.

Figure 6:
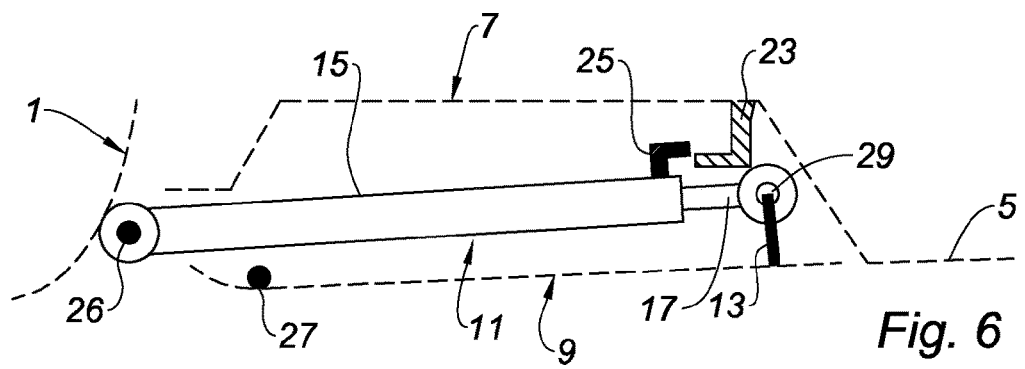
Figure 7:
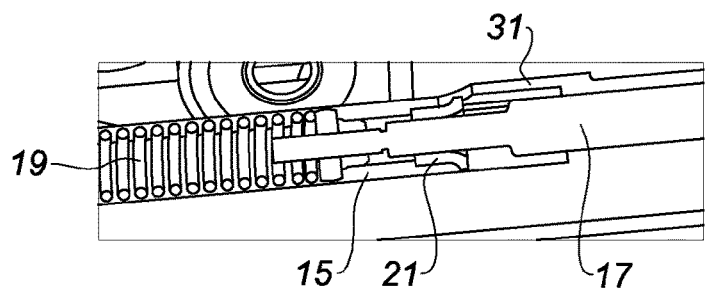

The rotational axes of the body 15 of the telescopic connecting rod 11 with respect to the front frame 1, of the reversal flap 9 with respect to the housing 7, and the stem 17 of the telescopic connecting rod 11 with respect to the triangle of hinged connecting rods 13, are indicated respectively by references 26, 27 and 29 of FIGS. 2 and 6.

It will now be described the operating mode of the thrust reverser according to the present disclosure, being noted that in reality a plurality of thrust reversal flaps 9 are disposed under the plurality of deviation cascades 3.

In direct jet operating mode, the cold air flow generated by the turbojet engine fan (not represented) circulates from upstream to downstream of the nacelle surrounding the turbojet engine, as is indicated by the arrow D of FIG. 1.

When the thrust reversal flap 9 is located in the aerodynamic extension of the sliding cowl 5, the flowing of the cold flow D is aerodynamically continuous and provides the necessary thrust for the propulsion of the airplane.

In this configuration, the second hook 25 integral with the body 15 of the telescopic connecting rod 11 is maintained engaged with the first hook 23 disposed inside the housing 7, and the spring 19 is in the compressed state.

The combination on the one hand of the immobilization of the body 15 of the telescopic connecting rod 11 with respect to the housing 7 thanks to the cooperation of the hooks 23 and 25, and on the other hand of the pre-stress exerted by the compressed spring 19 on the stem 17 of the telescopic connecting rod 11, allows sharply immobilizing the thrust reversal flap 9 inside the housing 7, thus cancelling any risk of vibration.

Figure 8:
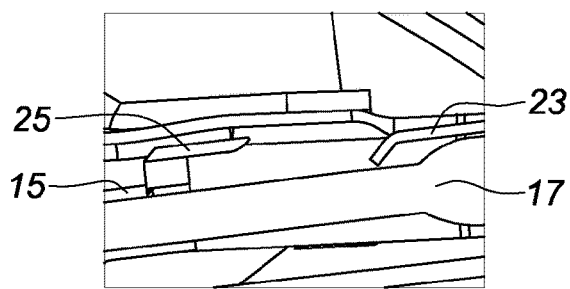

When the sliding cowl 5 starts to move from its direct jet position represented on FIG. 1 to its indirect jet position represented on FIG. 9, the second hook 25 becomes disengaged from the first hook 23, as is visible on FIGS. 5, 6 and 8.

The flap 9 is thus unlocked from the inside the housing 9.

Simultaneously, the spring 19 expands, taking the stem 17 in extension position with respect to the body 15 of the telescopic connecting rod 11, and thus until the stop 21 integral with this stem 17 is blocked against a complementary stop 31 defined by the body 15.

The coming into contact of the two stops 21 and 31 allows stopping any additional extension of the telescopic connecting rod 11, which may thus transmit tensile forces between the front frame 1 and the triangle of hinged connecting rods 13, thus allowing the putting in rotation of the flap 9 around the hinged axis 27 thereof, until it is in the indirect jet position represented on FIG. 9.

In this position, the sliding cowl 5 uncovers the deviation cascades 3, and the flap 9 hinders the stream of cold flow generated by the turbojet engine fan, thus allowing to divert at least part of this cold flow towards the upstream of the nacelle through the cascades 3, as is indicated by the arrow When the thrust reverser comes back from its indirect jet position represented on FIG. 9 to its direct jet position represented on FIG. 1, the arranging of the thrust reversal flap 9 inside the housing 7 thereof is facilitated by the dynamic pressure exerted by the cold air flow.

Figure 4:
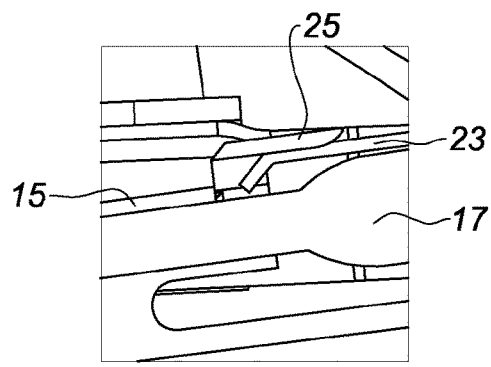
FIG. 4 is a detailed view of the area IV of FIG. 1.

The hook 25 of the body 15 of the telescopic connecting rod 11 engages again with the hook 23 mounted inside the housing 7, this engaging again being facilitated by bevels achieved on these two hooks, as is visible in particular on FIGS. 4 and 8.

The engaging again of the two hooks 25 and 23 is accompanied with a bringing into compression of the spring 19 by the stem 17 of the telescopic connecting rod, hence allowing immobilizing again the flap 9 inside its housing 7 by pre-stress, and thereby canceling any risk of vibration.

Obviously, the present disclosure is in no way limited to the described and represented forms, provided by way of mere examples.

What is claimed is:

1. A cascade thrust reverser, comprising:
   a stationary front frame;
   a plurality of deviation cascades integral with the stationary front frame; a sliding cowl movable between a direct jet position where the sliding cowl covers the deviation cascades, and a reverse jet position in which the sliding cowl uncovers the deviation cascades;
   at least one housing for receiving at least one thrust reversal flap formed in an upstream part of the sliding cowl,
   at least one thrust reversal flap pivotally mounted in said at least one housing, between a direct jet position where said at least one thrust reversal flap is arranged inside said at least one housing, and a reverse jet position in which said at least one thrust reversal flap exits said at least one housing;
   a connecting rod mechanism comprising a telescopic connecting rod connecting the stationary front frame to said at least one flap, the connecting rod mechanism configured to make said at least one flap swivel from the direct jet position to the reverse jet position as a result of sliding of the sliding cowl from the direct jet position to the reverse jet position; and
   a first hook mounted stationary on the inside of said at least one housing, wherein the telescopic connecting rod comprises:
   a body provided with a second hook, the second hook being integral with the body, and the second hook which is engaged with the first hook in the direct jet position and disengaged when the sliding cowl translates toward the reverse jet position;
   a stem slidably mounted inside the body;
   a spring returning the stem in extension position with respect to the body; and
   a stop preventing the stem from exiting the body, wherein the stem extends through the stop
   wherein in the direct jet position, said at least one flap is immobilized at a bottom of said at least one housing by the stem subjected to pre-stress caused by the spring compressed, and when the second hook becomes disengaged from the first hook, the stem engages with an extension in the body, allowing a rotation of said at least one flap from the direct jet position towards the reverse jet position under a tensile force exerted by the stem.

2. The cascade thrust reverser according to claim 1, wherein the connecting rod mechanism further comprises a triangle of hinged connecting rods, interposed between the telescopic connecting rod, said at least one housing and said at least one thrust reversal flap.

3. A nacelle for aircraft engine equipped with the cascade thrust reverser in accordance with claim 1.

* * * * *